United States Patent [19]

Brown et al.

[11] Patent Number: 5,297,752
[45] Date of Patent: Mar. 29, 1994

[54] SEAT BELT RETRACTOR WITH AN AUTOMATIC BELT TENSION REDUCER

[75] Inventors: Louis R. Brown; Steven G. Corrion, both of Oxford, Mich.

[73] Assignee: TRW Vehicle Safety Systems Inc., Lyndhurst, Ohio

[21] Appl. No.: 951,898

[22] Filed: Sep. 28, 1992

[51] Int. Cl.$^5$ .............................................. B60R 22/44
[52] U.S. Cl. ................................................. 242/107
[58] Field of Search ......... 242/107, 107.4 R, 107.4 A, 242/107.4 B; 280/806, 807; 297/475, 476, 477, 478, 479, 480

[56] References Cited

U.S. PATENT DOCUMENTS

| | | | |
|---|---|---|---|
| 4,088,281 | 5/1978 | Close | 242/107 |
| 4,125,231 | 11/1978 | Henderson | 242/107 |
| 4,216,922 | 8/1980 | Weman | 242/107 |
| 4,301,977 | 11/1981 | Yang | 242/107 |
| 4,483,494 | 11/1984 | Takada | 242/107 |
| 4,993,657 | 2/1991 | Brown | 242/107 |

*Primary Examiner*—John M. Jillions
*Attorney, Agent, or Firm*—Tarolli, Sundheim & Covell

[57] ABSTRACT

A seat belt retractor has a low tension mode in which seat belt webbing engages an occupant of a vehicle with a reduced force. A frame supports a spool on which belt webbing is wound for rotation in belt withdrawal and belt retraction directions. A sun gear is rotatable with the spool. A planet carrier rotatable relative to the sun gear rotatably supports a planet gear in meshing engagement with the sun gear. A ring gear rotatable relative to the spool and to the planet carrier has internal teeth in meshing engagement with the planet gear and external ratchet teeth. A spring connected between the planet carrier and the frame biases the spool in the belt retraction direction. A pawl is engageable with the external ratchet teeth on the ring gear to block rotation of the ring gear in a belt retraction direction to place the retractor in the low tension mode. A cam is rotatable relative to the spool and is engageable with the pawl to hold the pawl out of engagement with the ratchet teeth of the ring gear to disengage the low tension mode.

31 Claims, 6 Drawing Sheets

SEAT BELT RETRACTOR WITH AN AUTOMATIC BELT TENSION REDUCER

BACKGROUND OF THE INVENTION

The present invention relates to a vehicle seat belt retractor, and particularly relates to a vehicle seat belt retractor having a mechanism for reducing tension in seat belt webbing.

A known vehicle seat belt retractor comprises a spool for holding a wound length of seat belt webbing. The spool is supported for rotation in belt withdrawal and belt retraction directions. A spring biases the spool to rotate in the belt retraction direction to wind up the webbing onto the spool. The spool rotates in the belt withdrawal direction against the force of the spring when the webbing is unwound from the spool to be buckled around a vehicle occupant. After the webbing is buckled around the vehicle occupant, slack in the webbing is wound onto the spool because the spool is rotated in the winding direction by the spring. The webbing is thereafter held against the vehicle occupant by the force of the spring biasing the spool to rotate in the belt retraction direction. The force of the spring biasing the spool in the belt retraction direction and holding the webbing against the vehicle occupant may cause discomfort to the occupant.

Mechanisms for minimizing the force of the spring biasing the spool and holding the seat belt webbing against the occupant are known. U.S. Pat. No. 4,301,977 discloses a retractor having a spring with one end connected to a retractor housing and its other end connected to a disk rotatably supporting a plurality of planet gears. The planet gears mesh with a sun gear that is attached to a retractor spool around which a seat belt is wound. The planet gears also mesh with a ring gear that is rotatable relative to the retractor spool. Axially extending studs rotatably support the planet gears and extend into arcuate slots connected with the ring gear. A rocker block associated with the ring gear engages a fixed surface of the housing to prevent the ring gear from moving in the belt retraction direction.

Withdrawal of the belt causes the sun gear to rotate in the belt withdrawal direction which urges the planet gears to rotate in the opposite direction, which, in turn, produces a force in the belt retraction direction against the ring gear. Since the ring gear is prevented from rotating in the belt retraction direction, the engagement of the planetary gears with the ring gear causes the planetary gear studs to move in the belt withdrawal direction. The studs engage the ends of the slots in the ring gear and overcome the force of the rocker block to rotate the ring gear in the belt withdrawal direction. Thus, the sun gear, the disk and the ring gear all move in the belt withdrawal direction.

Upon buckling of the seat belt, the spring acts through the planet gears and sun gear on the spool of the retractor in a low tension mode. The spring urges the planetary gear studs to move in the belt retraction direction in the arcuate slots in the ring gear. The rocker block holds the ring gear stationary, causing the planetary gears to rotate in a counterclockwise direction about their axes which causes the sun gear to rotate in the belt retraction direction. Thus, the retractor is in a low tension mode due to the gear reduction between the planet gears and the sun gear.

When the seat belt is unbuckled, the planetary gear studs move in the belt retraction direction until they engage the ends of the arcuate slots in the ring gear. One of the planetary gear studs engages the rocker block to pivot the rocker block in a direction which allows the ring gear to move in the belt retraction direction. Thus, the sun gear, the disk and the ring gear all move in the belt retraction direction to retract the belt onto the spool.

SUMMARY OF THE INVENTION

The present invention provides a new and improved seat belt webbing retractor with a tension reducer. The retractor includes a spool on which seat belt webbing is wound and which is rotatable in a frame in belt withdrawal and belt retraction directions. The spool is biased in a belt retraction direction by a spring. A sun gear is mounted on and rotatable with the shaft of the spool. A planet gear rotatably supported on a planet carrier meshes with the sun gear. A ring gear rotatable relative to the spool and to the planet carrier has (a) internal teeth in meshing engagement with the planet gear and (b) external ratchet teeth. An inner end of the spring is connected to the planet carrier. The sun gear, the planet carrier, the planet gear and the ring gear interconnect the spool and the spring. A pawl movable relative to the retractor housing is biased into engagement with the external ratchet teeth of the ring gear to hold the retractor in the low tension mode.

In a preferred embodiment of the invention, the retractor includes a cam rotatable relative to the retractor spool. The cam has a pair of cam projections for engaging the pawl to move the pawl out of engagement with the ratchet teeth of the ring gear. The cam is rotatable on a count washer which, in turn, is rotatable on a driver fixed to the shaft. As the webbing is withdrawn from the retractor, the count washer couples the planet carrier for rotation with the sun gear. Thus, the spring acts directly on the belt webbing through the planet carrier, the count washer and the driver. When the seat belt is buckled, a slight retraction of the belt onto the spool occurs. The ring gear rotates a slight amount in the belt retraction direction until the pawl engages a ratchet tooth on the ring gear to lock the ring gear against further rotation. The spring then acts on the spool in a low tension mode through the gear reduction from the planet carrier to the sun gear, rather than directly through the count washer. When the belt is unbuckled, a wire dog on the count washer engages the cam to rotate the cam in the belt retraction direction. The cam moves the pawl out of engagement with the ring gear. The count washer again couples the planet carrier for rotation with the driver. Thus, the spring acts directly upon the spool to retract the webbing fully onto the spool.

In a second embodiment of the present invention, the ring gear comprises a gear member and an inertia member. The inertia member includes the external ratchet teeth, which are engageable by the pawl, and internal ratchet teeth. The gear member includes the internal teeth which mesh with the planet gear, and a plurality of leaf springs engaging the internal ratchet teeth of the inertia member. The inertia member can rotate relative to the gear portion only in the belt retraction direction. When the pawl is released from the inertia member to shift the retractor out of the low tension mode, the spring causes the ring gear to accelerate rapidly in the webbing retraction direction. When the count washer interlocks the driver and the planet carrier, the leaf springs allow the inertia member to continue to rotate in the belt retraction direction relative to the gear member. The torque of the rotating ring gear is thus dissipated through friction rather than passed through the retractor into the belt webbing.

In a third embodiment of the invention, the cam has only one projection for engaging the pawl. The wire dog on the count washer can pass below the cam projection in both the belt withdrawal and belt retraction directions. A stop on the retractor housing positions the cam projection in the same position after each belt withdrawal. In this position, the cam projection can not inadvertently prevent the pawl from engaging the ratchet teeth of the ring gear and prevent the retractor from shifting into the low tension mode.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS OF THE INVENTION

The present invention relates to a vehicle seat belt retractor, and particularly to a vehicle seat belt retractor having a mechanism for reducing tension in seat belt webbing.

As representative of the present invention, FIGS. 1–4 illustrate a vehicle seat belt retractor 10 including a retractor frame 16 fixed to the vehicle. A bearing plate 18 is fixed to the retractor frame 16. The bearing plate 18 supports a driver 30 for rotation relative to the retractor frame 16. The driver 30 rotates on an annular central bearing surface 20 of the bearing plate 18.

A length of seat belt webbing 12 is wound on a retractor spool 14. The belt webbing 12 is extendible around a vehicle occupant as a shoulder belt portion of a seat belt system. The retractor spool 14 is fixed for rotation with a cylindrical shaft 22. A portion 32 of the shaft 22 axially outward of the spool 14 has a pair of flat side surfaces. The shaft portion 32 is received in a correspondingly shaped keyway 34 in the driver 30 to fix the shaft 22 and the spool 14 for rotation with the driver 30. The shaft 22, the spool 14, and the driver 30 are all rotatable in a belt withdrawal direction 15 (FIG. 3) and in a belt retraction direction 17 relative to the retractor frame 16.

A spool locking ratchet wheel 24 (FIG. 1) is fixed for rotation with the retractor spool 14. The spool locking ratchet wheel 24 has a plurality of circumferentially spaced locking teeth 26. The locking teeth 26 on the spool locking ratchet wheel 24 are engaged in a known manner by a lock bar (not shown) to block rotation of the spool 14 in the belt withdrawal direction 15 in the event of deceleration of the vehicle at a rate above a predetermined rate. It is contemplated that rotation of the spool 14 in the belt withdrawal direction 15 could also be blocked in a known manner by withdrawal of belt webbing 12 from the spool at a rate above a predetermined rate.

Figure 2:
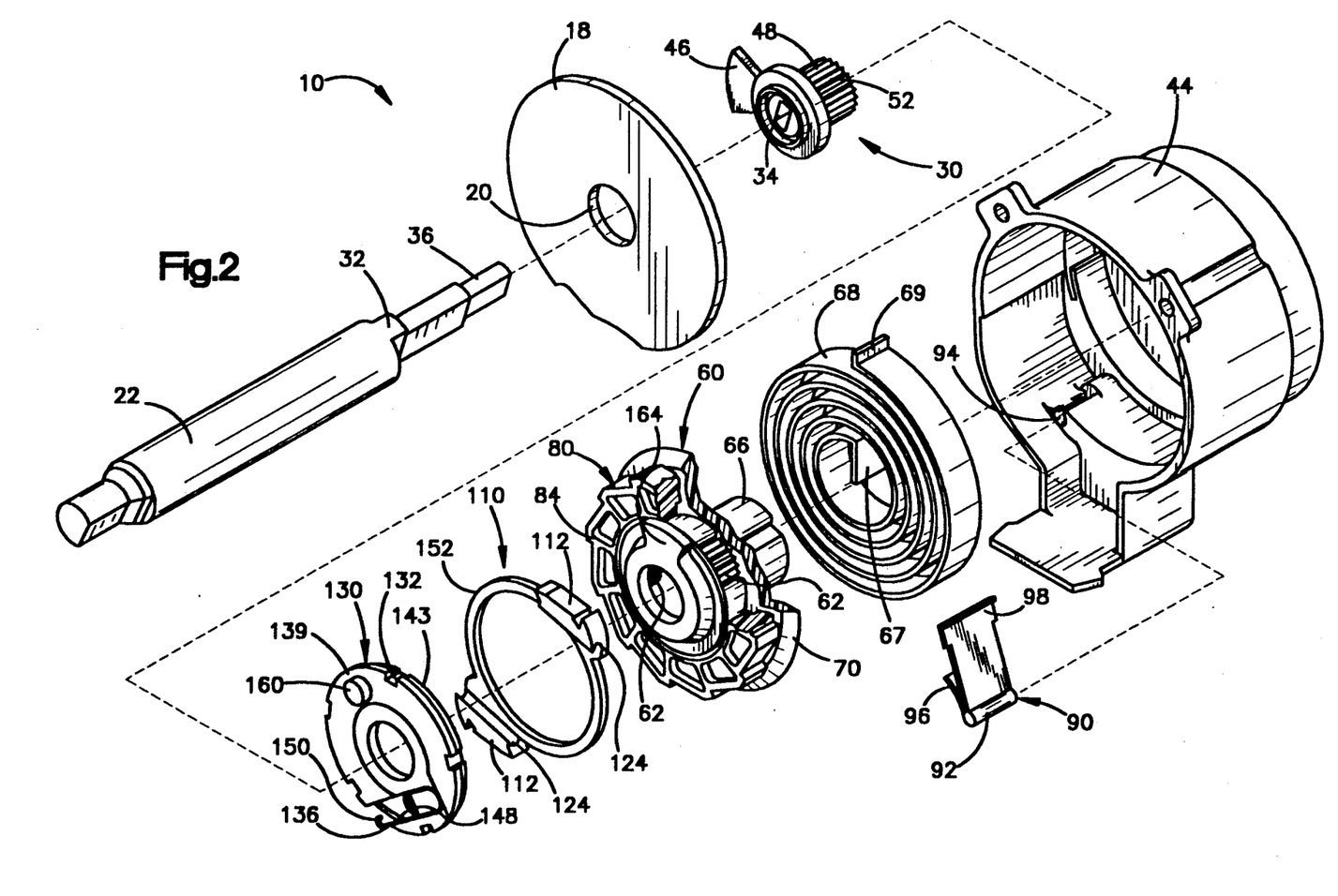
FIG. 2 is a an exploded view of certain parts of the retractor of FIG. 1.

The driver 30 has a radially extending portion 46 and an axially extending body portion 48 (FIG. 2). The driver body portion 48 includes a journal portion 50 (FIG. 1) having a smooth cylindrical outer surface and a sun gear 52 having a plurality of axially extending external gear teeth.

A planet carrier 60 (FIGS. 1 and 2) is rotatably supported on the journal portion 50 of the driver 30 and on an end portion 36 of the shaft 22. A plurality of externally toothed planet gears 62, preferably three (FIG. 4), are rotatably supported on shaft portions 64 of the planet carrier 60. The planet gears 62 meshingly engage the sun gear 52. The planet carrier 60 may be formed as two pieces to allow mounting of the planet gears 62 on the planet carrier 60.

The planet carrier 60 has an annular end portion 66 (FIGS. 1 and 2) which contacts the shaft portion 36 and to which an inner end 67 of a spiral return spring 68 is fixed. An outer end 69 of the return spring 68 is fixed to a cup-shaped housing 44 that encloses the planet carrier 60 and is secured to the retractor frame 16. The return spring 68 biases the planet carrier 60 to rotate in the belt retraction direction 17. The planet carrier 60 also has a radially extending flange portion 70 which holds the return spring 68 in position in the housing 44.

A ring gear 80 is supported on and extends circumferentially around the three planet gears 62. The ring gear 80 is rotatable relative to the planet carrier 60 and to the spool 14. A plurality of internal gear teeth 82 (FIG. 4) are spaced circumferentially around the inner perimeter of the ring gear 80. The ring gear teeth 82 meshingly engage the external gear teeth on the planet gears 62. A plurality of external ratchet teeth 84 are spaced circumferentially around the outer perimeter of the ring gear 80.

A pawl 90 is pivotally mounted on the housing 44. A stem portion 92 of the pawl 90 is fitted in a notch 94 (FIG. 4) in the housing 44. An end portion 98 of the pawl 90 is selectively engageable with the ratchet teeth 84 on the ring gear 80 to block rotation of the ring gear in the belt retraction direction 17. A leaf spring 96, which may be formed as one piece with the pawl 90, biases the pawl radially inwardly toward engagement with the ratchet teeth 84 of the ring gear 80.

An annular count washer 130 is supported for rotation on the journal portion 50 of the driver 30. The count washer 130 has a radially extending disc-shaped body portion 132 having axially opposite radially extending faces 139 and 143.

A first stud 160 (FIGS. 1 and 2) projects axially from the count washer body portion 132 in a direction toward the retractor spool 14. The stud 160 extends into the plane of rotation of the radially extending portion 46 of the driver 30. A second stud 162 projects axially from the count washer body portion 132 in a direction away from the retractor spool 14. The stud 162 extends into the plane of rotation of a radially extending portion 164 (FIG. 2) of the planet carrier 60.

The radially extending portion 164 on the planet carrier 60 can engage the stud 162 to rotate the count washer 130 with the planet carrier, and vice versa. The first stud 160 on the count washer 130 can engage the radially extending portion 46 of the driver 30 to rotate the driver 30 with the count washer, and vice versa. Thus, the count washer 130 can couple the spool 14, the driver 30 and sun gear 52, and the planet carrier 60 for rotation with each other during withdrawal of belt webbing 12 and also during retraction of belt webbing.

Figure 1:
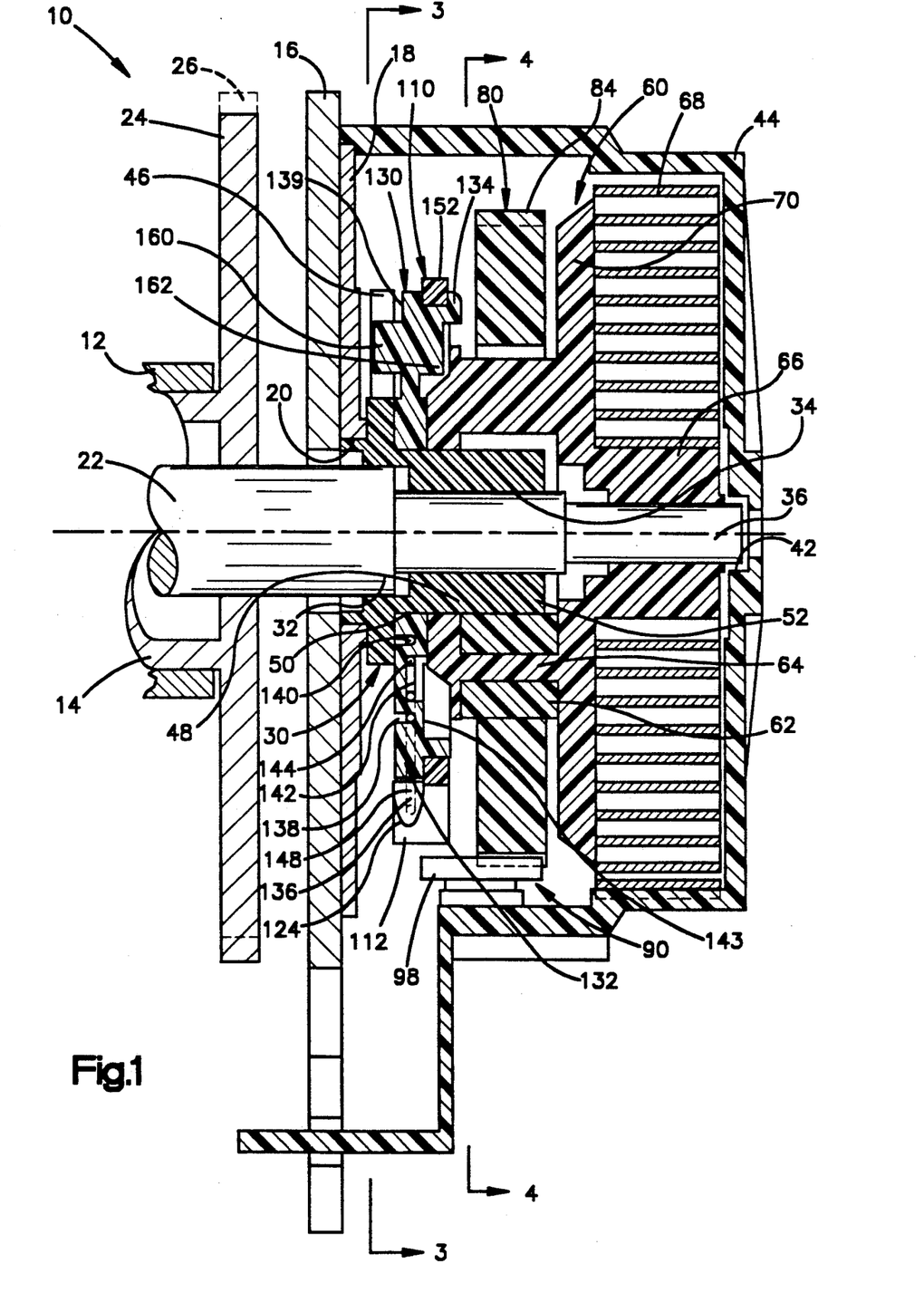
FIG. 1 is an enlarged cross-sectional view of a portion of a seat belt retractor embodying the present invention.
Figure 3:
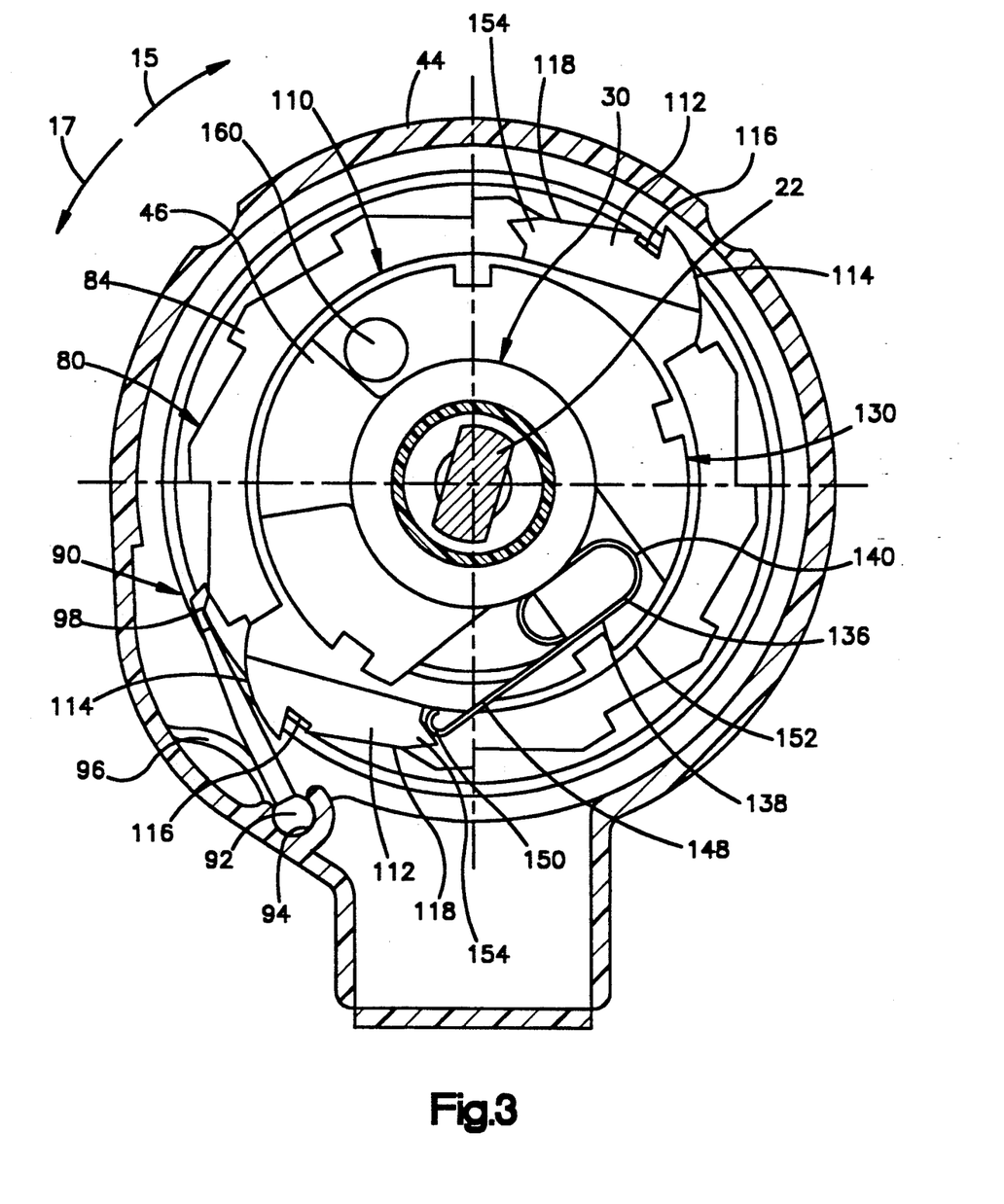
FIG. 3 is a sectional view taken along line 3—3 of FIG. 1.
Figure 4:
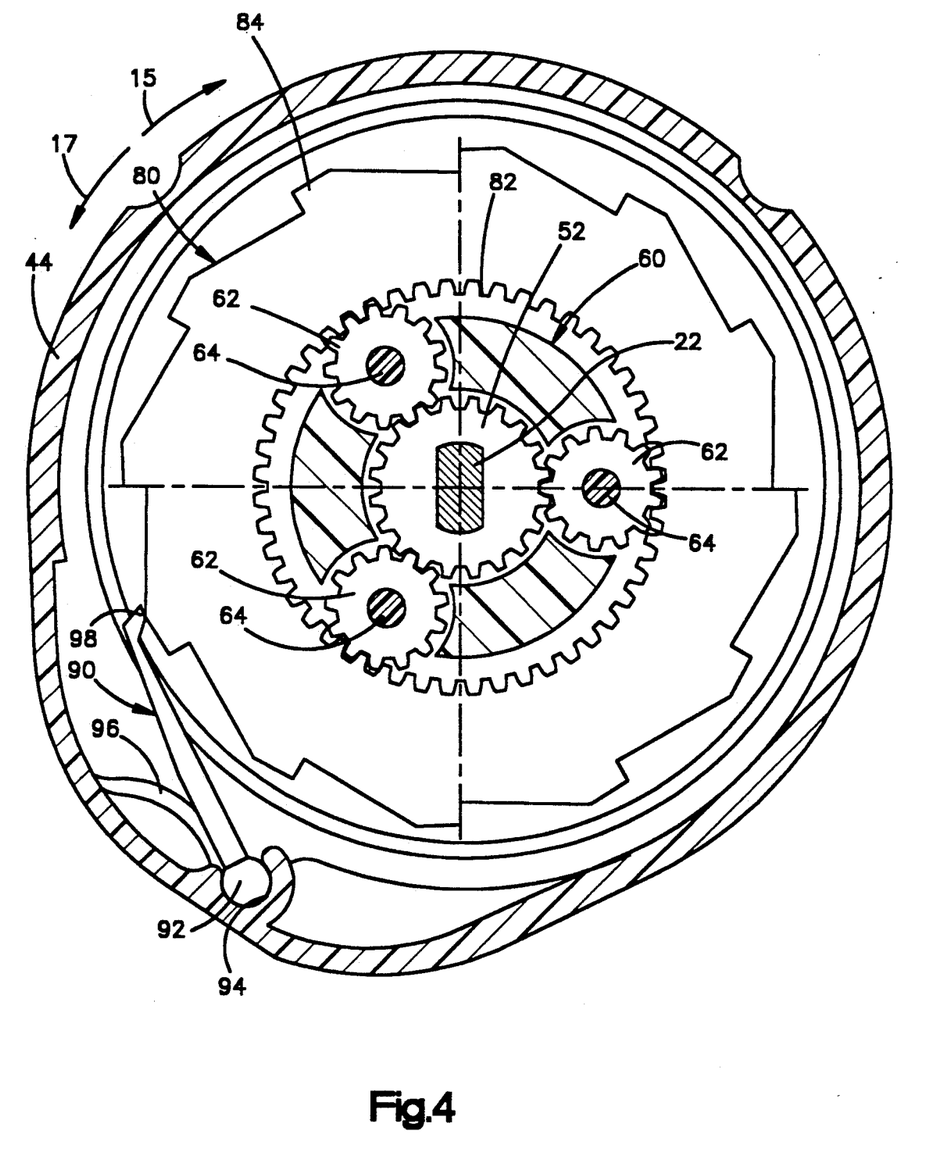
FIG. 4 is a sectional view taken along line 4—4 of FIG. 1.

The count washer 130 carries a deflectable wire dog 136 (FIGS. 1-3). A U-shaped groove 138 in the radially extending face 139 of the count washer body portion 132 receives an outer loop portion 140 of the wire dog 136. A recess 142 (FIG. 1) in the axially opposite face 143 of the count washer body portion 132 receives an inner loop portion 144 of the wire dog 136. The loop portions 140 and 144 are resiliently deflectable out of a common plane and thus grip opposite sides of the count washer body portion 132 to retain the wire dog 136 in position on the count washer 130. The wire dog 136 has a deflectable portion 148 (FIG. 3) with a rounded end portion 150 that projects radially outwardly of the count washer body portion 132.

A ring-shaped cam 110 is rotatably supported on the outer circumference of the body portion 132 of the count washer 130. The cam 110 is held on the count washer body portion 132 by a plurality of circumferentially spaced retainers 134, one of which is seen in FIG. 1, which extend axially and radially from the count washer body portion. The retainers 134 hold the cam 110 in position on the count washer 130 for rotation relative to the count washer.

The cam 110 has a pair of diametrically opposed cam projections 112 which project radially outward from a annular body portion of the cam. The cam projections 112 also project axially from the cam body portion in a direction toward the spool 14 and into the plane of rotation of the wire dog 136. Thus, as the count washer 130 rotates relative to the cam 110, the deflectable portion 148 of the wire dog 136 can engage the cam projections 112. The end portion 98 of the pawl 90 also is disposed partially in the plane of rotation of the cam projections 112.

Each cam projection 112 has on its radially outer circumference a first cam surface 114 (FIG. 3) and a second cam surface 118. A notch 116 is disposed circumferentially between and separates the cam surfaces 114 and 118. A half-oval shaped groove 124 (FIGS. 1 and 2) extends circumferentially along the radially inner circumference of each cam projection 112.

When the vehicle occupant initially withdraws belt webbing 12 stowed on the retractor spool 14 to buckle the safety belt, the retractor spool rotates in the belt withdrawal direction 15. The driver 30, which is fixed for rotation with the shaft 22 and thus with the spool 14, also rotates in the belt withdrawal direction 15. The radially extending portion 46 of the rotating driver 30 engages the first stud 160 on the count washer 130, as seen in FIG. 3, and causes the count washer to rotate with the driver 30 and with the spool 14. As the count washer 130 rotates, the second stud 162, on the opposite face of the count washer, engages the radially extending portion 164 of the planet carrier 60 and causes the planet carrier also to rotate with the count washer 130. Thus, the count washer 130 couples the planet carrier 60 for rotation with the spool 14. Since the inner end 67 of the return spring 68 is connected with the annular end portion 66 of the planet carrier 60, rotation of the planet carrier and of the spool 14, in the belt withdrawal direction 15, is resisted by the full force of the return spring.

Because the planet carrier 60 rotates with the sun gear 52 during this initial stage of belt withdrawal, the planet gears 62 do not rotate on their support shafts 64. Since the planet gears 62 do not rotate on their support shafts 64, the ring gear 80 is blocked from rotation relative to the sun gear 52. Thus, the ring gear 80 rotates with the sun gear 52 and with the spool 14 in the belt withdrawal direction 15. As the ring gear 80 rotates, the pawl 90 rides along the exterior of the rotating ring gear 80.

During belt withdrawal, the wire dog 136 revolves with the count washer 130 in the belt withdrawal direction 15. The wire dog 136 revolves in the plane of rotation of the cam projections 112 on the cam 110. Thus, within one half of a rotation of the count washer 130, the wire dog 136 engages an end portion 154 (FIG. 3) of one or the other of the cam projections 112 and pushes the cam 110 to rotate in the belt withdrawal direction 15.

As the cam 110 rotates in the belt withdrawal direction 15, the cam projections 112 pass one after the other under the pawl 90, in a clockwise direction as seen in FIG. 3. As each cam projection 112 engages the pawl 90, the pawl end portion 98 is urged radially out along the first cam surface 114 of the cam projection. The pawl end portion 98 passes over the notch 116, and drops onto the second cam surface 118. The pawl end portion 98 then drops off the cam projection 112 and rides along the ring gear ratchet teeth 84 until the next cam projection 112 comes around to lift the pawl end portion off the ring gear ratchet teeth.

After the seat belt apparatus is buckled, the belt webbing 12 is released by the vehicle occupant. A small amount of slack is typically present in the belt webbing 12 after buckling. Thus, the return spring 68 begins to rotate the planet carrier 60 in the belt retraction direction 17. The radially extending portion 164 of the planet carrier 60, which is in abutting engagement with the second stud 162 on the count washer 130, transmits the force of the return spring 68 through the planet carrier 60 to the count washer 130. The count washer 130 thus begins to rotate in the belt retraction direction 17. As the count washer 130 rotates, the first stud 160 on the count washer, which is in abutting engagement with the radially extending portion 46 of the driver 30, immediately transmits the force of the return spring 68 through the count washer 130 to the driver 30. The driver 30 begins to rotate in the belt retraction direction 17. The driver 36 rotates the shaft 22 and thus the spool 14 in the belt retraction direction. Belt webbing 12 is wound on the retractor spool 14 under the full force of the return spring 68.

Because the driver 30 is rotating with the planet carrier 60 during this initial period of belt retraction after withdrawal and buckling, the sun gear 52, which is part of the driver 30, rotates with the planet carrier 60. Therefore, the planet gears 62 do not rotate on their support shafts 64. Because the planet gears 62 do not rotate, the ring gear 80 is blocked from rotation relative to the sun gear 52. Therefore, the ring gear 80 rotates with the sun gear 52 and with the retractor spool 14 in the belt retraction direction 17.

This initial period of belt retraction, under the full force of the return spring 68, lasts for only a short rotational displacement, that is, only until the ring gear 80 rotates enough so that one of the ratchet teeth 84 on the ring gear rotates into engagement with the pawl 90. When this occurs, the ring gear 80 is blocked from further rotation in the belt retraction direction 17. The planet gears 62 can then rotate on their support shafts 64 relative to the sun gear 52. The force of the return spring 68 is then transmitted to the sun gear 52 through the gear reduction of the planetary gear set including the sun gear and the planet gears 62. Accordingly, the sun gear 52 continues to rotate the retractor spool 14 in the belt retraction direction 17, but with less torque. This reduces the tension felt by the vehicle occupant from the belt webbing 12. Thus, even after all slack is taken out of the length of belt webbing 12 extending around the vehicle occupant, the vehicle occupant can move around relatively freely, in this low tension "comfort" mode of the retractor 10, against the reduced bias of the return spring 68 resulting from the gear reduction of the planet gears 62 and the sun gear 52.

After the ring gear 80 is blocked from rotation in the belt retraction direction, the spool 14 rotates faster than the planet carrier 60 because of the planetary gear reduction. In the illustrated embodiment, for example, the ring gear 80 has forty eight internal teeth 82; the planet gears 62 each have thirteen teeth; and the sun gear 52 has twenty teeth. Thus, one rotation of the planet carrier 60, when the ring gear 80 is blocked from rotation, would produce 2.4 rotations of the sun gear 52 (and thus of the spool 14) if not for the belt engaging the vehicle occupant.

When the retractor 10 is in the comfort mode, the pawl 90 engages the ratchet teeth 84 and the vehicle occupant can move around against the lower tension of the seat belt webbing 12. However, if the occupant leans forward far enough to withdraw a sufficient amount of belt webbing 12 from the retractor spool 14, the comfort mechanism may be deactivated. This happens if the spool 14 rotates far enough in the belt withdrawal direction 15 (FIG. 3) so that the radially extending portion 46 of the driver 30 engages the first stud 160 on the count washer 130. The count washer 130 rotates in the belt withdrawal direction 15 along with the driver 30. The second stud 162 of the count washer 130 engages the radially extending portion 164 of the planet carrier 60. Thus, the count washer 130 couples the planet carrier 60 for rotation with the spool 14 against the full force of the return spring 68, just as occurs upon initial withdrawal of stowed belt webbing 12 from the retractor spool 14. The retractor 10 is thus shifted out of the low tension mode. When the occupant then leans back, however, the low tension mode is again activated after a small amount of rotation of the spool 14 and the ring gear 80 in the belt retraction direction 17, just as occurs upon release of the belt webbing 12 after buckling the seat belt.

When the vehicle occupant unbuckles the seat belt system, the planet carrier 60 rotates in the belt retraction direction 17 under the influence of the return spring 68. The radially extending portion 164 of the planet carrier 60, which is in abutting engagement with the second stud 162 on the count washer 130, causes the count washer to rotate in the belt retraction direction 17. The spool 14 rotates in that direction at a rate faster than the rate of rotation of the planet carrier 60 due to the gear reduction. The more rapidly rotating spool 14 carries with it the driver 30 and its radially extending portion 46. The radially extending portion 46 of the driver 30 thus pulls away from the first stud 160 of the count washer 130, in the belt retraction direction 17.

The wire dog 136 rotates with the count washer 130 in the belt retraction direction 17, relative to the cam 110, until the wire dog 136 engages in the groove 124 of one of the cam projections 112. The wire dog end portion 150 enters the groove 124 and is deflected radially inwardly in the groove. As the wire dog end portion 150 is deflected radially inwardly in the groove 124, enough friction eventually develops between the wire dog 136 and the cam projection 112 so that the wire dog 136 begins to pull the cam 110 in the belt retraction direction 17.

The wire dog 136 pulls the cam 110 in the belt retraction direction 17 until the second cam surface 118 on one of the cam projections 112 engages the pawl end portion 98. The second cam surface 118 moves the pawl end portion 98 radially outward out of engagement with the ratchet teeth 84 of the ring gear 80. The pawl end portion 98 drops into the notch 116 in the cam projection 112 to prevent further rotation of the cam 110 in the belt retraction direction 17. The cam 110 holds the pawl 90 out of engagement with the ring gear 80, allowing the ring gear 80 to rotate in the belt retraction direction 17.

The planetary gear set is thus deactivated, and the retractor spool 14 no longer rotates faster than the planet carrier 60. The return spring 68 has very little opposing force and causes the planet carrier 60 to accelerate rapidly in the belt retraction direction 17. The ring gear 80 accelerates in the same direction but faster because of the multiplication between the planet carrier 60 and the ring gear 80.

The planet carrier 60 rotates faster than the spool 14. The planet carrier rotates in the belt retraction direction 17 until the first stud 160 of the count washer 130 engages the radially extending portion 46 of the driver 130. This couples the spool 14 for direct rotation with the planet carrier 60, and the spool rotates with the full force of the return spring 68 until the belt webbing 12 is fully wound on the spool.

During belt retraction, the cam 110 is blocked from rotation in the belt retraction direction 17 by the engagement of the pawl end portion 98 in the notch 116. However, the force of the return spring 68 continues to act on the count washer 130 and the wire dog 136. The wire dog 136 is deflected radially inwardly and pulled completely through the groove 124 in the cam projection 112. Thus, the count washer 130 can continue to rotate in the belt retraction direction 17 relative to the cam 110.

If the occupant leans forward far enough and then sits back, when the belt webbing 12 is retracted onto the spool 14 the retractor shifts from the high tension mode to the low tension mode, as discussed above, and then back into the high tension mode as if the belt were unbuckled. As noted above, immediately following deactivation of the comfort mechanism of the retractor 10 (by disengagement of the pawl 90 from the ring gear ratchet teeth 84), the planet carrier 60 accelerates rapidly in the belt retraction direction 17. The ring gear 80 also accelerates in the belt retraction direction 17 because of the multiplication between the planet gears 62 and the ring gear 80. After approximately two revolutions of the planet carrier 60 relative to the retractor 10, the count washer 130 couples the driver 30 with the planet carrier. When this happens, the rapidly spinning ring gear 80 is suddenly slowed. The torque of the rapidly spinning ring gear 80 is transmitted through the retractor 10 into the belt webbing 12. This can cause the belt webbing 12 to "slap" on the occupant's shoulder.

Figure 5:
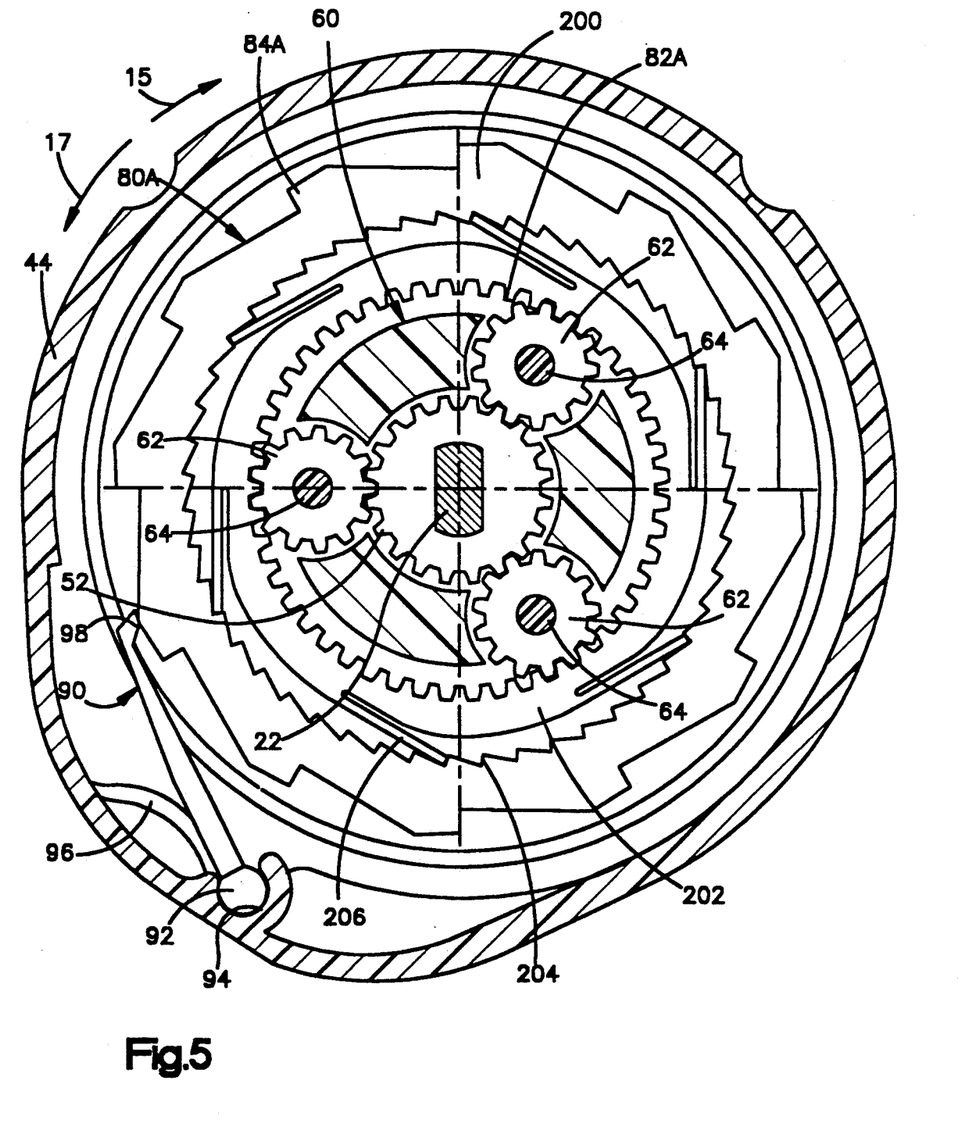
FIG. 5 is a sectional view similar to FIG. 4, illustrating a second embodiment of the invention.

To minimize this effect, the second embodiment of the invention, illustrated in FIG. 5, includes a ring gear 80A made of two separate parts, an inertia member 200 and a gear member 202. The inertia member 200 is made of a high density material such as powder metal brass or stainless steel. The inertia member 200 has a plurality of external ratchet teeth 84A engageable by the pawl 90. The inertia member 200 also has a plurality of internal ratchet teeth 204. The gear member 202 has a plurality of leaf springs 206 extending radially outward and engageable with the internal ratchet teeth 204 of the inertia member 200. The leaf springs 206 may be formed as one piece with the gear member 202 or may be attached to the gear member. The gear member 202 also has a plurality of internal teeth 82A for engagement with the planet gears 62.

The leaf springs 206 form a one-way clutch between the gear member 202 and the inertia member 200 so that the inertia member can rotate relative to the gear member only in the belt retraction direction 17. Because of this, the relatively high density inertia member 200 not only retards the acceleration and ultimate velocity of the rotating ring gear 80A, but it also allows the inertia member 200 to continue to rotate relative to the gear member 202 in the belt retraction direction 17, when the count washer 130 interlocks the driver 30 and the planet carrier 60. The torque of the rotating ring gear 80A is due mostly to the inertia member 200 and is almost entirely dissipated in friction between the internal ratchet teeth 204 of the inertia member 200 and the leaf springs 206 on the gear member 202. This minimizes the torque transmitted from the ring gear 80 to the retractor spool 14, reducing "slap" of the belt webbing 12 on the vehicle occupant's shoulder.

In the embodiment of the invention shown in FIGS. 1-4, when the seat belt webbing 12 is withdrawn about the vehicle occupant and buckled, it is possible for the cam projection 112 to stop in engagement with the pawl 90. This would prevent the pawl from engaging the ratchet teeth 84 of the ring gear 80. The retractor 10 would then be blocked from entering the low-tension mode as desired.

Figure 6:
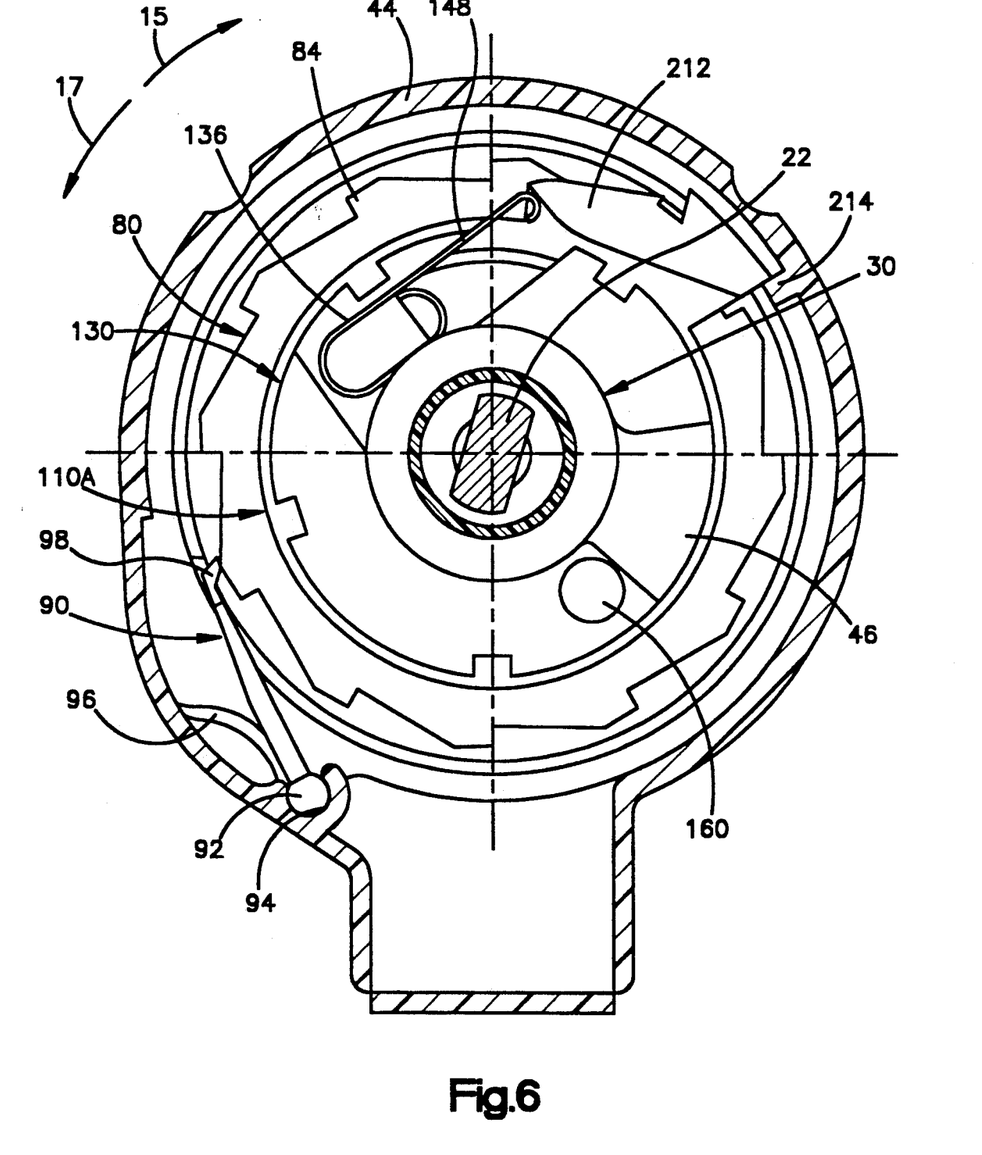
FIG. 6 is a sectional view similar to FIG. 3, illustrating a third embodiment of the invention.

To prevent this from happening, in a third embodiment of the invention (FIG. 6), the cam 110A only has one cam projection 212. When the belt webbing 12 is withdrawn from the retractor 10, the wire dog 136 engages the cam projection 212 to rotate the cam 110A in the belt withdrawal direction 15. The cam projection 212 engages a stop 214 on the housing 44 to prevent the cam 110A from rotating in the belt withdrawal direction 15. The radially inner surface of the cam projection 212 is formed so that the deflectable wire dog 136 can pass under the cam projection 212 in both the belt withdrawal direction 15 and the belt retraction direction 17. As the count washer 130 rotates in the belt withdrawal direction 15, the wire dog 136 is deflected radially inwardly and passes below the cam projection 212.

Thus, after initial belt withdrawal by the vehicle occupant when first buckling the seat belt, the cam projection 212 is located in the same position no matter how much belt webbing 12 is withdrawn from the retractor 10. In this position, the cam projection 212 is not under the pawl 90 and thus can not hold the pawl out of engagement with the ring gear 80 to prevent the retractor 10 from shifting into the low tension mode.

Further, because the cam projection 212 (FIG. 6) is always in the same position after belt withdrawal, the length of the comfort zone (that is, how much belt webbing 12 can be retracted before disengaging the comfort mechanism) is always the same. The length of the comfort zone is determined by the placement of the stop 214 and thus the location of the cam projection 212 relative to the pawl 90.

From the above description of the invention, those skilled in the art will perceive improvements, changes and modifications in the invention. Such improvements, changes and modifications within the skill of the art are intended to be covered by the appended claims.

We claim:

1. A seat belt retractor having a low tension mode in which belt webbing engages an occupant of a vehicle with a relatively small force, said retractor comprising:
a frame;
a spool on which said belt webbing is wound and which is rotatable in said frame in belt withdrawal and belt retraction directions;
a spring biasing said spool in the belt retraction direction;
a sun gear;
a planet carrier rotatable relative to said sun gear;
gear means rotatably supported on said planet carrier for meshing with said sun gear;
a ring gear rotatable relative to said planet carrier, said ring gear having internal teeth in meshing engagement with said gear means rotatably supported on said planet carrier and also having external ratchet teeth,
said sun gear, said planet carrier, said gear means and said ring gear interconnecting said spring and said spool;
a pawl movable between a first position engaging said external ratchet teeth of said ring gear and blocking rotation of said ring gear in the belt retraction direction to hold said retractor in the low tension mode and a second position in which said pawl does not block rotation of said ring gear in the belt retraction direction; and
means for moving said pawl from the first position to the second position to shift said retractor out of the low tension mode.

2. A retractor as set forth in claim 1 wherein said means for moving said pawl from the first position to the second position comprises a cam, said cam having a surface for engaging said pawl to move said pawl from the first position to the second position.

3. A retractor as set forth in claim 2 wherein said cam is rotatable relative to said spool, said cam being operable to hold said pawl in the second position.

4. A retractor as set forth in claim 2 wherein said means for moving said pawl from the first position to the second position further comprises a count washer rotatable with said spool and engageable with said cam to rotate said cam relative to said frame to effect movement of said pawl from the first position to the second position.

5. A retractor as set forth in claim 4 wherein said count washer includes a wire dog engageable with a first portion of said cam to rotate said cam in the belt withdrawal direction, said wire dog being engageable with a second portion of said cam to rotate said cam in the belt retraction direction, said cam and said pawl cooperating to block rotation of said cam in the belt retraction direction by said count washer, said wire dog being deflectable to enable said count washer to rotate relative to said cam in the belt retraction direction when said cam is blocked from rotation in the belt retraction direction by said pawl.

6. A retractor as set forth in claim 4 wherein said cam is supported for rotation on a journal portion of said count washer.

7. A retractor as set forth in claim 4 wherein said count washer is rotatable relative to said spool, a drive extension connected to and rotatable with said spool being engageable with said count washer to rotate said count washer with said spool.

8. A retractor as set forth in claim 7 wherein said count washer includes a first stud engageable with said drive extension and a second stud engageable with said planet carrier, said first stud engaging said drive extension and said second stud engaging said planet carrier to prevent relative rotation between said spool and said planet carrier.

9. A retractor as set forth in claim 1 further comprising means for preventing relative rotation between said sun gear and said planet carrier to cause said sun gear, said planet carrier, said ring gear and said spool to rotate together.

10. A retractor as set forth in claim 9 wherein said means for preventing relative rotation between said sun gear and said planet carrier comprises means for enabling said sun gear to directly drive said planet carrier and means for enabling said planet carrier to directly drive said sun gear.

11. A retractor as set forth in claim 9 wherein said means for preventing relative rotation between said sun gear and said planet carrier comprises a count washer rotatable with said sun gear, said count washer including a first stud engageable with said planet carrier, said first stud engaging said planet carrier to prevent relative rotation between said sun gear and said planet carrier.

12. A retractor as set forth in claim 11 wherein said count washer is rotatable relative to said sun gear, said count washer including a second stud, said sun gear being connected to a drive extension engageable with said second stud, said first and second studs engaging said drive extension and said planet carrier simultaneously to prevent relative rotation between said sun gear and said planet carrier.

13. A retractor as set forth in claim 1 further comprising a one-way clutch means for blocking transfer of torque from said ring gear to the belt webbing.

14. A retractor as set forth in claim 13 wherein said ring gear comprises an inertia member and a gear member, said inertia member including said external ratchet teeth engageable by said pawl and internal ratchet teeth, said gear member including said internal teeth in meshing engagement with said planet gear and a leaf spring engaging said internal ratchet teeth of said inertia member, said inertia member being rotatable relative to said gear member only in the belt retraction direction.

15. A seat belt retractor having a low tension mode in which belt webbing engages an occupant of a vehicle with a relatively small force, said retractor comprising:
a frame;
a spool on which the belt webbing is wound and which is rotatable in said frame in belt withdrawal and belt retraction directions;
a spring biasing said spool in the belt retraction direction;
a sun gear;
a planet carrier rotatable relative to said sun gear;
gear means rotatably supported on said planet carrier for meshing with said sun gear;
a ring gear rotatable relative to said planet carrier, said ring gear having internal teeth meshing with said gear means rotatably supported on said planet carrier,
said sun gear, said planet carrier, said gear means and said ring gear interconnecting said spool and said spring;
one of said sun gear, said planet carrier and said ring gear including ratchet teeth;
a pawl movable between a first position engaging said ratchet teeth to hold said retractor in the low tension mode and a second position in which said pawl does not engage said ratchet teeth;
means connected with said frame for biasing said pawl toward the first position; and
a cam rotatable relative to said spool, said cam having a surface for moving said pawl from the first position to the second position to shift said retractor from the low tension mode.

16. A retractor as set forth in claim 15 further comprising a count washer rotatable with said spool and engageable with said cam to rotate said cam relative to said frame to move said pawl from the first position to the second position.

17. A retractor as set forth in claim 16 wherein said count washer is rotatable relative to said spool, a drive extension connected to and rotatable with said spool being engageable with said count washer to rotate said count washer with said spool.

18. A retractor as set forth in claim 16 wherein said planet carrier is rotatable relative to said spool, said count washer being engageable with said planet carrier to prevent relative rotation between said spool and said planet carrier.

19. A retractor as set forth in claim 15 including means for preventing relative rotation between said planet carrier and said sun gear.

20. A retractor as set forth in claim 15 wherein said ring gear comprises an inertia member and a gear member, said inertia member being rotatable relative to said gear member to reduce transmission of torque from said ring gear to the belt webbing.

21. A seat belt retractor having a low tension mode in which belt webbing engages an occupant of a vehicle with a relatively small force, said retractor comprising:
a frame;
a spool on which the belt webbing is wound and which is rotatable in said frame in belt withdrawal and belt retraction directions;
a spring biasing said spool in the belt retraction direction;
a sun gear;
a planet carrier rotatable relative to said sun gear;
gear means rotatably supported on said planet carrier for meshing with said sun gear;
a ring gear rotatable relative to said planet carrier, said ring gear having internal teeth in meshing engagement with said gear means rotatably supported on said planet carrier,
said sun gear, said gear means, and said ring gear interconnecting said spring and said spool;
means for shifting said retractor into the low tension mode; and
a count washer rotatable with said spool, said count washer having a first stud engageable with one of said sun gear, said planet carrier and said ring gear to prevent relative rotation between said sun gear, said planet carrier and said ring gear.

22. A retractor as set forth in claim 21 wherein said planet carrier has a radially extending portion engageable by said first stud on said count washer to prevent relative rotation between said sun gear, said planet carrier and said ring gear.

23. A retractor as set forth in claim 22 wherein said count washer is rotatable relative to said sun gear, said count washer including a second stud engageable with a drive extension connected to said sun gear, said first and second studs being simultaneously engageable with said planet carrier and said drive extension to prevent relative rotation between said sun gear, said planet carrier and said ring gear.

24. A retractor as set forth in claim 21 wherein said means for shifting said retractor into the low tension mode includes a pawl engageable with ratchet teeth located on one of said sun gear, said planet carrier and said ring gear.

25. A retractor as set forth in claim 24 further including a cam rotatable with said spool, said cam being engageable with said pawl to move said pawl out of engagement with said ratchet teeth.

26. A seat belt retractor having a low tension mode in which belt webbing engages an occupant of a vehicle with a relatively small force, said retractor comprising:
 a frame;
 a spool on which seat belt webbing is wound and which is rotatable in said frame in belt withdrawal and belt retraction directions;
 a spring biasing said spool in the belt retraction direction;
 a sun gear;
 a planet carrier rotatable relative to said sum gear;
 gear means rotatably supported on said planet carrier for meshing with said sun gear;
 a ring gear rotatable relative to said planet carrier, said ring gear having internal teeth in meshing engagement with said gear means rotatably supported on said planet carrier;
 said sun gear, said planet carrier, said gear means and said ring gear interconnecting said spring and said spool; and
 means for preventing relative rotation between said sun gear and said planet carrier and causing said gear means to rotate said ring gear along with said sun gear and said planet carrier;
 said means for preventing relative rotation between said sun gear and said planet carrier and causing said gear means to rotate said ring gear along with said sun gear and said planet carrier comprises a count washer having a first means for engaging said sun gear and a second means for engaging planet carrier, said first means engaging said sun gear and said second means engaging sad planet carrier simultaneously to prevent relative rotation between said sun gear and said planet carrier.

27. A retractor as set forth in claim 26 wherein said sun gear is connected to and rotatable with said spool and said planet carrier is connected to said spring.

28. A retractor as set forth in claim 26 further including means for preventing rotation of said ring gear relative to said frame to shift said retractor into the low tension mode.

29. A seat belt retractor having a low tension mode in which belt webbing engages an occupant of a vehicle with a relatively small force, said retractor comprising:
 a frame;
 a spool on which said belt webbing is wound and which is rotatable in said frame in belt withdrawal and belt retraction direction;
 a spring biasing said spool in the belt retraction direction;
 a sun gear;
 a planet carrier rotatable relative to said sun gear;
 gear means rotatably supported on said planet carrier and for meshing with said sun gear; and
 a ring gear rotatable relative to said planet carrier, said ring gear having internal teeth in meshing engagement with said gear means rotatably supported on said planet carrier;
 said ring gear comprising an inertia member and a gear member, said inertia member including internal ratchet teeth, said gear member including said internal teeth in meshing engagement with said planet gear and a leaf spring engaging said internal ratchet teeth of said inertia member, said inertia member being rotatable relative to said gear member only in the belt retraction direction;
 said sun gear, said planet carrier, said gear means and said ring gear interconnecting said spring and said spool.

30. A retractor as set forth in claim 29 wherein said sun gear is connected to and rotatable with said spool and said planet carrier is connected to said spring.

31. A retractor as set forth in claim 29 further including means for preventing relative rotation between said sun gear, said planet carrier, and said gear member upon retraction of the belt webbing.

* * * * *